United States Patent [19]

Pinsard et al.

[11] Patent Number: 4,585,303
[45] Date of Patent: Apr. 29, 1986

[54] OPTICAL CABLE HEADER

[75] Inventors: Jean-Jacques Pinsard, Vigneux sur Seine; Jacques Roger, Morsang sur Orge, both of France

[73] Assignee: Compagnie Industrielle des Telecommunication CIT-Alcatel, Paris, France

[21] Appl. No.: 520,282

[22] Filed: Aug. 4, 1983

[30] Foreign Application Priority Data

Aug. 4, 1982 [FR] France ................... 82 13627

[51] Int. Cl.⁴ ............................... G02B 6/36
[52] U.S. Cl. ............................ 350/96.20; 350/96.21
[58] Field of Search ................ 350/96.20, 96.21, 96.22

[56] References Cited

U.S. PATENT DOCUMENTS

| 4,167,303 | 9/1979 | Bowen et al. | 350/96.21 |
| 4,217,030 | 8/1980 | Howarth | 350/96.21 |
| 4,266,853 | 5/1981 | Hutchins et al. | 350/96.20 |
| 4,428,645 | 1/1984 | Korbelak et al. | 350/96.20 |
| 4,445,753 | 5/1984 | Collignon | 350/96.21 |

FOREIGN PATENT DOCUMENTS

3118173 11/1982 Fed. Rep. of Germany .
2098354 11/1982 United Kingdom .

Primary Examiner—John Lee
Assistant Examiner—Lester Rushin, III
Attorney, Agent, or Firm—Sughrue, Mion, Zinn, Macpeak and Seas

[57] ABSTRACT

The header comprises: a plurality of optical connector supports (3) each having an elongate body in the form of a hollow finger (30) which is equipped at one end with an optical connector member (31) for interconnecting a pair of connection end fittings, and on one side with a coil former (32) for receiving the single fiber (55) of said cable (5) which has its end fitting (56) connected inside said finger to said connector member (31); and a magazine (1) comprising a plurality of individual cavities (10) for each of said optical connector supports (3) whose connector members constitute optical accesses to the individual fibers of said cable, said accesses being available in a "front" face (1C) of said magazine. It thus becomes possible to make optical connections to any of the individual fibers without affecting links passing via connections made to any of the other fibers.

15 Claims, 12 Drawing Figures

OPTICAL CABLE HEADER

The present invention relates to making connections between optical fibers. It relates more specifically to an optical assembly referred to as an "optical cable header", which is intended to enable the individual fibers of an optical cable to be optically connected to optical fibers in other cables and/or equipment independently of the other fibers in the cable, and preferably by a simple plugging action.

Such a cable header could then be used in any situation where releasable optical connections are to be made to optical cables, for example between all or some of the individual fibers in two optical cables. Such a cable header would be particularly applicable to telephone transmission systems using optical fiber cable. Identical header structures could then be used to individually connect each fiber of a line cable to optical sub-assemblies such as optical repeater-regenerators at intermediate stations or to electro-optical sub-assemblies at terminal stations. Such headers could be used interchangeably both for providing direct links between the fibers of two lengths of cable and also for providing temporary and individual connections of cable fibers to measurement and testing sub-assemblies at said stations.

BACKGROUND OF THE INVENTION

In general, an optical connection can be made between two fibers by installing connection end fittings on the ends of the respective fibers, and then bringing said end fittings together in a suitable connector equipment. In each end fitting, the end face of a fiber is rectified and suitably positioned for providing accurate optical connection when two connection fittings are brought together. One means for positioning the end of the fiber is described in published French Pat. No. 2 275 787 and in its certificate of addition published under Ser. No. 2 316 611. This positioning means uses a set of three cylindrical rods which are kept in contact with the fiber placed in an inner channel defined by the three rods. In order to connect a plurality of fibers in one cable with the fibers in another cable, said positioning means is constituted by a central rod having a ring of peripheral rods pressed against each other and the central rod, with the optical fibers being placed in respective ones of the channels defined by the central rod and pairs of the peripheral rods. The fibers of two cables are then simultaneously connected in pairs by bringing together two cable ends having their fibers fitted in such positioning means.

Such optical fiber cable ends can only be used for simultaneously connecting all the fibers in two identical cables. They do not engage individual connections to be made to one or more selected fibers such as would enable a selection of the fibers in one cable (varying from a few to all the fibers depending on requirements) to be connected to corresponding fibers in another cable or to other equipment. Such equipment could be means for regenerating or opto-electronically converting the data being conveyed by each fiber, or else it could be means for performing measurements and tests on the fibers. Further, when two cables are interconnected by such optical fiber cable ends, a defect in the connection between any one pair of fibers will lead to the connection between all the other pairs of fibers being interrupted while the defect is being repaired. Repairing such a faulty link is in itself difficult, and it is often impossible to perform a repair on the faulty fiber alone. In general, one of the cables needs to be cut and its cut end then needs new end fittings installing on all of its fibers.

Preferred embodiments of the present invention provide a cable header which enables any or all of the fibers of an optical cable to be individually and independently connected to optical fibers in other cables and/or equipment while avoiding the above-mentioned drawbacks of prior connection devices.

SUMMARY OF THE INVENTION

The present invention provides a header for an optical fiber cable, said cable having a plurality of optical fibers with each fiber having a connection end fitting installed on its end, the improvement wherein said header comprises a plurality of optical connector supports for receiving individual ones of said fibers together with their connection end fittings, and a magazine for receiving said connector supports; each of said optical connector supports comprising an elongate body in the form of a hollow finger which is equipped at a front end with an optical connector member for interconnecting a pair of connection end fittings, and which is equipped on one side with a coil former for receiving a coiled length of a single fiber when received in said optical connector support, said optical connector member having a portion located inside said hollow finger and adapted to receive the connection end fitting of said single fiber; the magazine comprising a body having a plurality of cavities, each cavity being adapted to receive a single one of said optical connector supports and to retain said support in such a position that a portion of its connector member is held accessible from a front face of the magainze to receive a connection end fitting installed on the end of an optical fiber which is external to the header.

BRIEF DESCRIPTION OF THE DRAWINGS

An embodiment of the invention is described by way of example with reference to the accompanying drawings, in which.

MORE DETAILED DESCRIPTION

Figure 1:
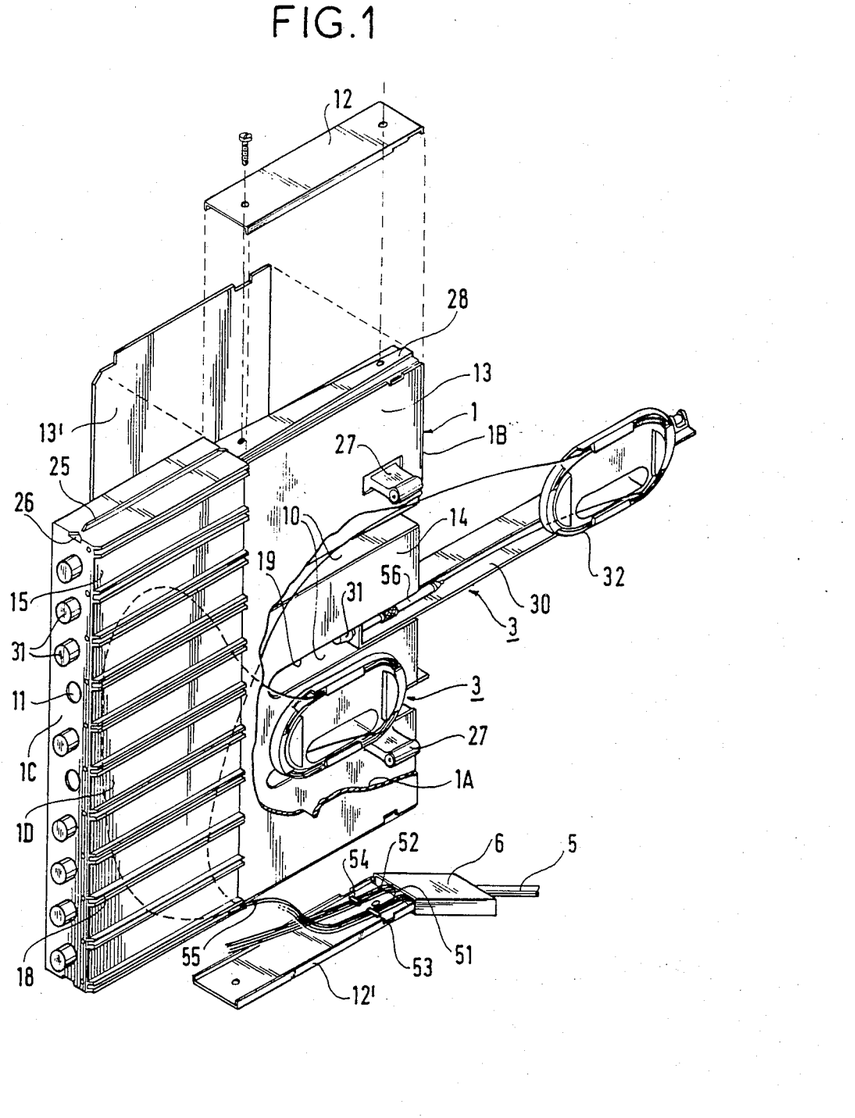
FIG 1 is a partially exploded and partially cut away perspective view of an optical cable header in accordance with the invention.

The optical header shown in FIG. 1 comprises a magazine 1 housing a plurality of identical optical connector supports such as the two connector supports 3 which are visible in the cut-away portion 1A of one of the walls of the magazine. One of these two connector supports is fully engaged in its housing in the magazine, and the other one is nearly fully withdrawn.

With reference to the optical connector support 3 which is shown nearly withdrawn from its cavity in the magazine 1, it can be seen that the connector support has an elongate body in the form of a hollow finger 30. The finger bears a cylindrical connector member 31 at a front end, and it has a side-mounted former 32 for coiling a length of optical fiber located near to its opposite or "rear" end.

The magazine 1 is generally in the shape of a rectangular slab, i.e. a flat rectangular parallelipiped, and it includes a row of cavities such as the two cavities 10 which can be seen in the cut-away portion. One of these cavities 10 houses the optical connector support 3 which is shown nearly withdrawn and the other visible cavity is shown higher up and empty of any optical connector support 3 of this type. These cavities open out in the rear face marked 13 of the magazine for receiving the optical connector supports. They also open out in the front face marked 1C via circular openings 11, two of which are visible for the above-mentioned cavities 10, and which are intended to receive the connector members 31 of the optical connector supports when received in their housings.

In the embodiment shown, the magazine is capable of receiving ten optical connector supports 3, i.e. it has ten cavities for housing individual connector supports 3.

The header 1 is mounted to an optical cable 5. In the embodiment described the cable 5 has ten optical fibers 55 and may be of the flat ribbon type, the cylindrical core type, or the independent fiber type. The end of the cable 5 is stripped and passed through a sleeve 6 in which each individual fiber of the cable is provided with its own protective covering. The recovered fibers are divided into two identical sets 51, 52 of five fibers 55 which emerge from the sleeve 6 and are fixed at 53 and 54 to a bottom plate 12' of the magazine 1. The recovered fibers such as 55 enter the magazine 1 through the bottom, with the bottom plate 12' defining an inlet for the ten fibers 55 into the magazine. In an equivalent variant, the cable fibers 55 could enter the magazine via an identical top plate 12. The top and bottom plates each cover the rear half of their respective top and bottom magazine surfaces. The fibers 55 may be the end portions of the fibers which run along the length of the cable or else they may be distinct lengths of fiber connected to the cable fibers. In either case, the fibers are admitted into the magazine 1 independently of its ten cavities, and in two groups of five fibers each.

In FIG. 1, for cavity in the drawing, only two of the fibers 55 are shown connected to the visible optical connector supports 3, the remaining fibers 55 have been shown cut short.

The free end of each fiber 55 is has a connection end fitting 56 installed thereon, which fitting can be seen for the fiber 55 mounted in the optical connector support 3 which is shown nearly withdrawn. Since the end fitting 56 is of known type, it is not described in detail. It may, for example, be of the type having three rods for receiving and positioning the end of the fiber, as already outlined in the introduction to the present specification, or it may be of any other equivalent type.

The fibers 55 in the two sets run from their entry point into the magazine 1 and include round respective loose loops behind each of the large side walls of the magazine, as can be seen at 1D, before having suitable lengths, e.g. 1 to 2 meters, coiled on the side coil formers 32 of respective optical connector supports 3. Each fiber 55 then has an end portion that runs from the coil former 32 along the hollow finger 30 of the associated optical connector support 3 with the connector end fitting 56 thereon plugged into the connector member 31 mounted to the first end of the connector support finger 30.

Once the optical connector support 3 is in place in its housing, one end of connector member 31 projects beyond the front face 1C of the magazine 1, while its end inside the finger 30 is connected to the end fitting 56 of one of the fibers 55. The connector member 31 is thus ready to be connected to an external fiber (not shown) by receiving a plug-in end fitting on said external fiber, which fiber may belong to another cable, or it may form an inlet or outlet of suitable equipment. The connector member 31 thus constitute optical sockets which are connected to individual fibers of the cable 5 and which are accessible at the front face 1C of the magazine 1.

Two plates 13 and 13' four a portion of each of the large side walls of the magazine, and in particular they cover the coil formers 32 of the optical connector supports 3 so that the completed cable header 1 has the shape of a conventional rectangular box. The plates 13 and 13' are held in place by side flanges on the top and bottom plates 12 and 12' which are themselves screwed to the magazine.

Further description of the optical cable header is made with reference to FIG. 1 in conjunction with FIGS. 2 to 6 which relate to the magazine 1 without its optical connector supports, and in conjunction with FIGS. 7 to 11 which relate to any one of the optical connector supports 3.

Figure 2:
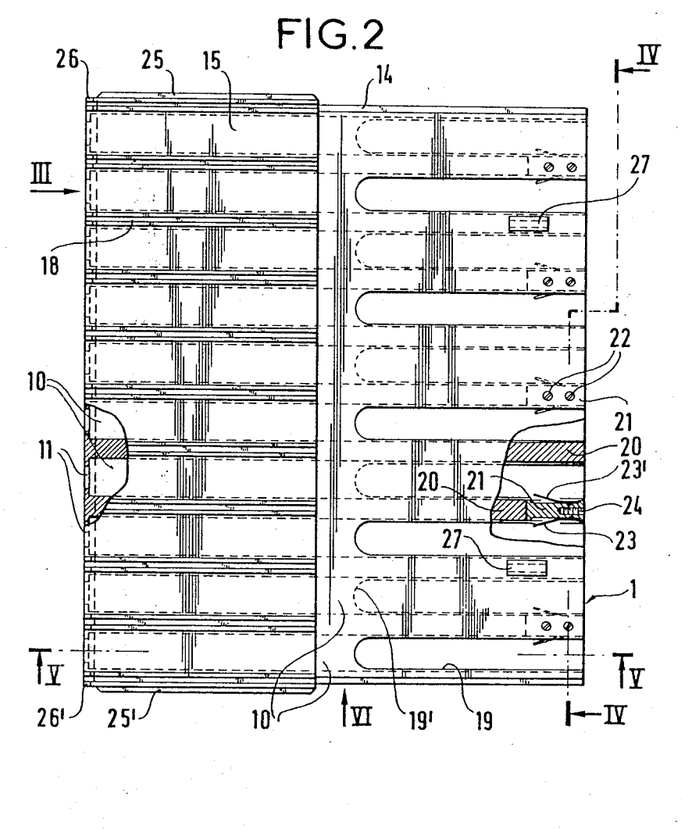
FIG. 2 is a partially cut away side view of the magazine of the cable header shown in FIG. 1.
Figure 5:
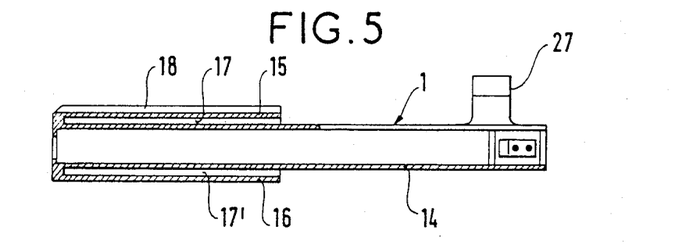
FIGS. 5 and 6 are two further views of the magazine along a line V—V and an arrow VI in FIG. 2, with FIG. 6 being in partial section.

With reference to FIGS. 1, 2 and 5 in particular, it can be seen that the magazine 1 is constituted by a main body 14 in the shape of a rectangular parallelipiped having a row of cavities 10 formed therein. The front half or so of the body 14 is fitted with two side plates 15 and 16 which stand off outwardly from the body 14 and which extend over the full height of the body and about half its length starting from the front face 1C. The side plates 15, 16 define two side grills 17 and 17' for receiving the respective sets of individual fibers where they are loosely looped on their paths between their entry to the magazine 1 and the coil formers 32 on the optical connector supports 3 on which they are received.

Carried by each optical connector support 3, the coil former 32 is located outside the main body 14 of the magazine and lies against one or other of the rear halves of the large side walls thereof, such as 1D. The cavities 10 which open out to the rear face 1B, open out, via oblong windows 19 or 19' extending from the rear face 1B, through the large side walls 1D of the body 14, where they are not covered by the side plates 15 and 16. Going up or down the row of cavities 10, the windoes 19 and 19' alternate within opposite side walls 1D. The optical connector support 3, when loaded into successive ones of the cavities 10 have coil formers alternatively on opposite sides of the cable headers so that the coil formers 32 can occupy about twice the height along the side faces of the magazine than would otherwise have been available for them if all the optical connector supports were on the same side. This arrangement enables the individual fibers to be coiled using a radius of curvature that is compatible with the requirements for data transmission without making the cable header excessively tall. Thus, in the embodiment shown, the optical connector supports when mounted in the magazine 1 are at a pitch of 42.5 mm and the radius of curvature of the individual fibers on their coil formers is never less than 40 mm.

Figure 4:
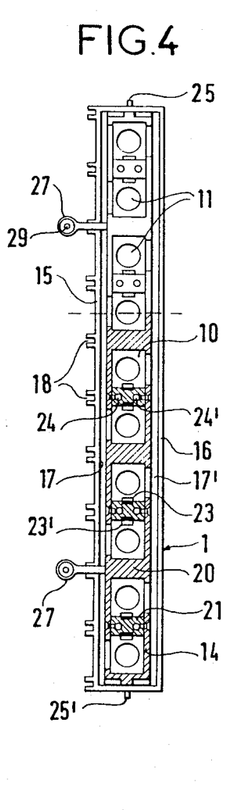
Figure 12:
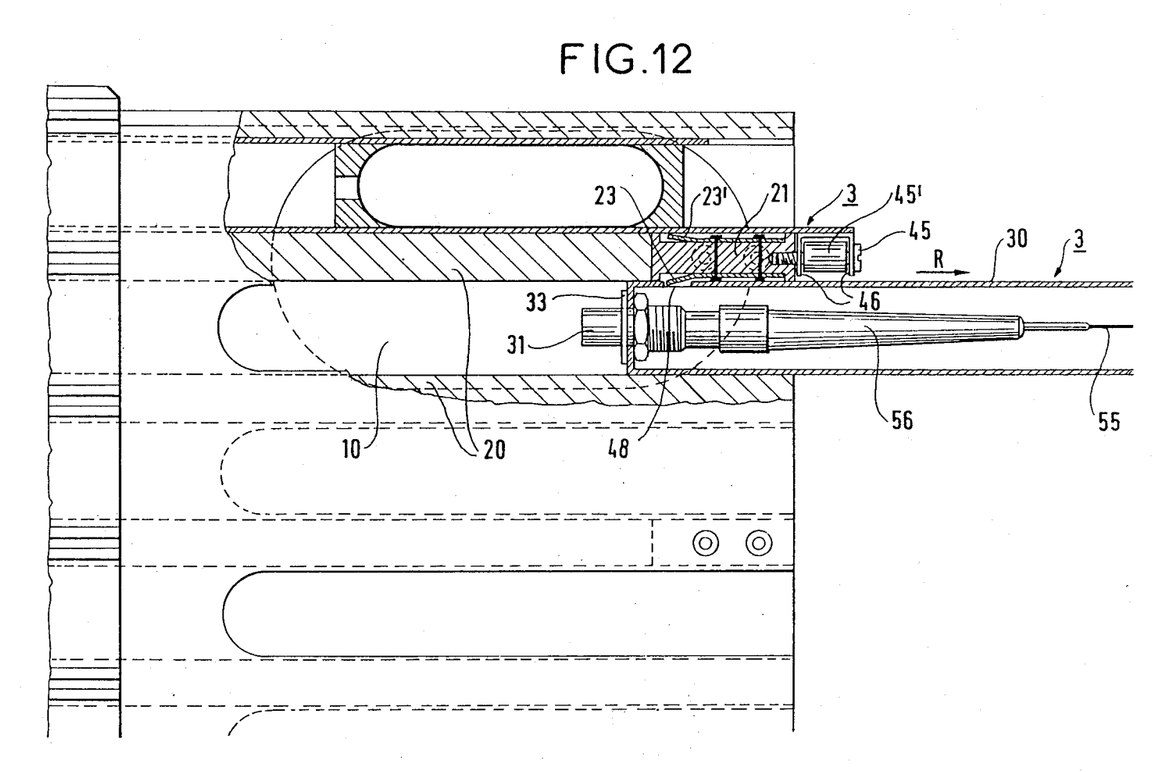
FIG. 12 is a partial section view showing the magazine of FIG. 2 with one of its optical connector supports locked in its cavity and another support of the same type having only its end engaged in its cavity.

Inside the main body 14 of the magazine, the cavities 10 are of practically the same cross section as the fingers 30 of the optical connector supports which are housed therein by sliding. With particular reference to FIGS. 2 and 4, it can be seen that the cavities are separated and partially formed transverse by internal partitions 20, with the vertical row end cavities being closed by the top and bottom walls of the main body. The internal partitions 20 are machined alternately in full and in part out of the material of the main body 14. Every other partition extends in one piece all the way from the front face 1C of the magazine 1 to its rear face 18, while the intermediate partitions stop short in the vicinity of the rear face, and are then prolonged by add-on parts 21 which are fixed to the side walls of the magazine by pairs of screws or rivets 22. Each add-on part 21 is provided with a pair of resilient latch blades 23, 23' which project into each of the adjacent cavities 10 when the cavities are empty. In FIGS. 2 and 4 it can be seen that five out of the nine internal partitions 20 are fitted with such add-on parts 21. Thus each of the ten cavities has a corresponding latch blade which is resiliently biased to project into the cavity when empty, and which is pressed down against the part 21 on which it is mounted when a support 3 is inserted into the cavity. The operation of the latch blades 23 and 23' is described in greater detail further on with reference to FIG. 12.

The add-on parts 21 are also provided with a pair of tapped holes 24 and 24'. The tapped holes are used for locking the two optical connector supports 3 when they are lodged in the adjacent cavities.

Figure 3:
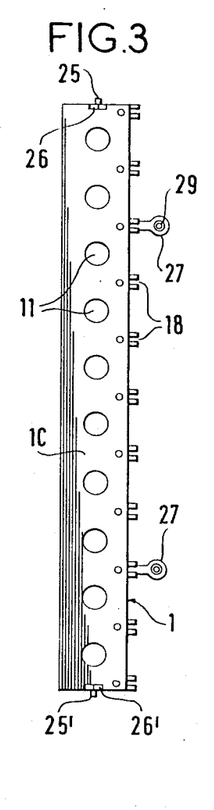
FIGS. 3 and 4 are a front view and a rear view of the magazine shown in FIG. 2, taken along an arrow III and a chain-dotted line IV—IV in FIG. 2.

With reference to FIGS. 1 and 2, and with particular reference to FIGS. 3, 4, and 5, it can be seen that the side plate 15 of the magazine carries a row of guides which in the present case are in the form of outwardly directed grooved slideways such as 18. These slideways are advantageously used to hold and to position the housings of equipment which is to be connected to the optical cable header.

In the example shown, the optical cable header has eleven slideways 18 on its side plate 15 to correspond with the ten optical connector supports 3 that may lodged in its cavities. This arrangement means that only one of the side plates 15 and 16 need be fitted with slideways while still enabling equipment housings to be fitted to the left or to the right hand side of the cable header 1, simply by turning the header over.

Figure 6:
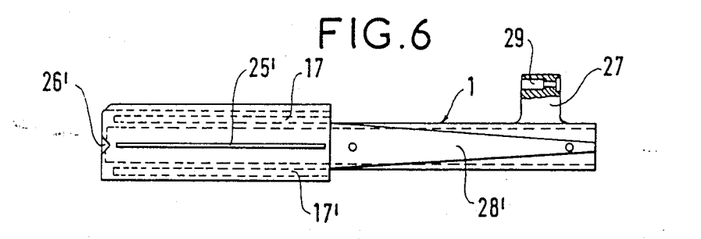
Figure 7:
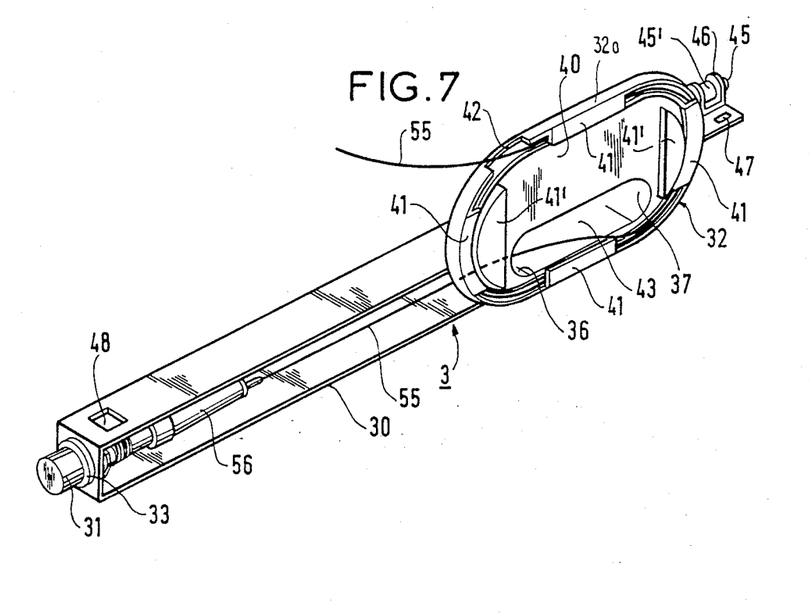
FIG. 7 is a perspective view of one of the optical connector supports of the FIG. 1 cable header.
Figure 8:
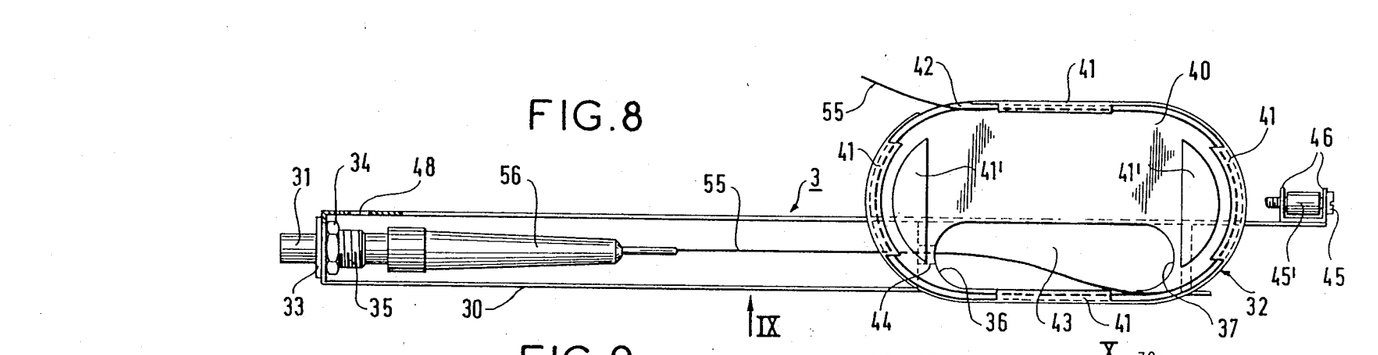
FIG. 8 is a side view of the FIG. 7 optical connector support.

With reference to the same figures and also to FIG. 6, it can be seen that the front halves of the top and bottom walls of the magazine 1 are each provided with a single axially extending slide guide rib 25, 25'. Each front half also has a positioning means in the form of a triangular notch 26, 26' placed symmetrically relative to the rib and having its base opening out in the front face 1C of the magazine. Although not shown, it will be readily understood that the ribs 25, 25' can be used for positioning the optical cable header between two supports fitted with grooved slideways which serve to position the cable header on said supports. The cable header can thus be fitted, in use, to a rack, frame, beam or the like having such supports. The header may be locked in place by means of screws fitted in fixing lugs such as 27 which project from the rear portion of one of the large side faces.

In FIGS. 1 and 6, it can also be seen that the rear halves of the top and bottom walls of the magazine 1 beneath top and bottom plates 12 and 12' each include a longitudinal tapering central rib at 28 and 28' respectively having a narrow end directed towards the rear face 1B of the magazine. Each tapering rib 28 and 28' leaves two separate paths on either side of itself and under the adjacent top or bottom plate 12 or 12', via which paths the two sets of five individual fibers 55 may enter the slide gills 17 and 17' of the magazine 1.

Also in FIG. 6, which shows one of the fixing lugs 27 in section, it can be seen that the lug has a recess 29 for receiving a screw for fastening to a rack, beam or external frame.

With reference to FIGS. 7 to 11 which show an optical connector support 3, it can be seen that the hollow finger 30 is constituted by a rigid blade formed of elongate U shape and which is preferably made of metal.

The connector member 31 is mounted within the bottom of the U, having ends projecting inside and outside the finger, to receive the end fitting 56 of a fiber 55 inside the finger and to receive an analogous end fitting of an external fiber (not shown) for connection to the fiber 55. The connector member 31 has an equatorial flange 33 which is pressed against the outside face of the bottom of the U, and a threaded portion 35 adjacent the flange and inside the finger over which a nut 34 is screwed to fasten the connector member to the finger. Four corner holes such as 30a (see FIG. 11) extend through the bottom of the U in order to receive a connector member (not shown), of a different design from the member 31.

The coil former 32 is constituted by an oval plate 40 so that it approximates to the general shape of an ellipse which has been flattened along its short axis. This illustrated shape enables the received fiber to be coiled with sufficient radius of curvature not to interfere with transmission requirements, while occupying as little as possible of the height of the magazine. Naturally, in a variant, the coil former could be circular, provided that the radius of the circle is compatible with transmission along the fiber. In practice, the shape of the coil former will be a compromise between the height available, and hence the total height of the magazine, and ease of manufacture, which will generally be by molding. It should be observed that if a coil former of circular shape is used, then the length of the magazine could be reduced in the direction in which the cavities 10 extend.

The plate 40 is mounted on one of the sides of the finger 30, across the two branches of the U and substantially at their free ends. Its maximum height corresponding to the length of the short axis of the ellipse is about twice the height of the finger. On the inside face of the plate 40, i.e. the face next to the finger, the coil former has two lugs 36 and 37 both of which are inserted between the branches of the U. The coil former 32 is fixed to both branches of the finger 30 by means of each of the lugs and pairs of screws such as 38 and 39. Portions of said lugs adjacent to the plate 40 also form a path for sliding the optical connector support along the edges of the window 19 or 19' of the cavity which receives the support.

The edge 32a of the coil former 32 is doubly folded towards outwardly, i.e. away from the finger 30. The doubly folded edge 32a is notched to define distinct peripheral tongues all referenced 41 which between them provide several possible peripheral access points 42 through which the fiber 55 can enter the coil from outside the optical connector support, i.e. from one or other of the side gills of the magazine 1 (see FIG. 1). The tongues 41 thus serve to hold the desired length of fiber 55 as received in the coil former. They also make it possible to manually uncoil a portion of the coiled length, if necessary.

The coil former 32 also has an an oblong window 43 through the plate 40 which constitutes a access opening enabling the fiber 55 to pass from the outside face of the fiber coil to the inside face next to the finger 30 and hence to the interior of the finger. The window 43 is aligned with the inside volume of the fiber between the two branches of its U, and its width is substantially equal to the distance between the branches. Advantageously, portions 41 and 41' of the plate 40 on either side of the window 43 are reinforced by thickening.

To leave the fiber 55 free passage along the entire length of the finger 30, the coil former fixing lug 36 closest to the bottom of the U has a central slot 44 running along its entire length. The end portion of the fiber 55 with the end connection fitting 56 mounted thereon passes through the window 43 and the slot 44 to reach the bottom of the U where the end fitting is received in the connector member 31.

In the embodiment shown, the coil former 32 is mounted on the finger 30 in such a manner that it projects slightly beyond one of the U-shape branches of the finger, while it projects considerably beyond the other branch.

Naturally some other position for the coil former relative to the finger could be adopted in a variant.

Figure 9:
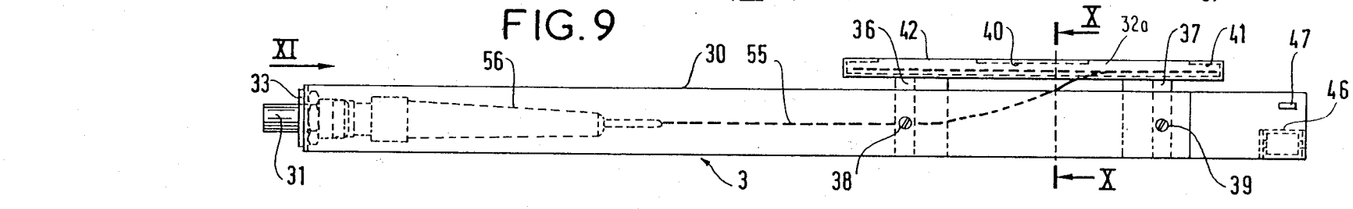
FIG. 9 is a bottom view of the optical connector support along an arrow IIX in FIG. 8.
Figures 10, 11:
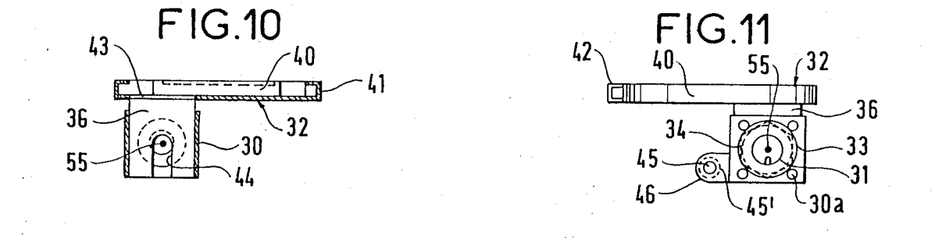
FIGS. 10 and 11 are two sectional views of the optical connector support along a line X—X and an arrow XI in FIG. 9.

The optical connectort support 3 further includes means for locking it into the magazine described above. These locking means comprise a captive screw 45 mounting a cylindrical spacer 45' to a bracket 46. The bracket is fixed to the end of one of the branches of the U-shaped finger 30, and in the example illustrated it is fixed to the branch which lies along the middle of the coil former plate 40. The bracket 46 and its captive screw 45 are the end parts of the optical connector support 3 at the opposite end to the connector member 31. The U-shaped finger branch on which the bracket is mounted is thus slightly longer than the other finger branch, and its end projects beyond the end of the coil former 32. On the end of said longer branch, the bracker 46 is mounted next to the longitudinal edge which is further from the coil former 32, while an eye 47, FIG. 9, is provided next to the other longitudinal edge.

The optical connector support is locked in the magazine by the screw 45 being fixed in the corresponding tapped hole 24 or 24' of the part 21 (see FIGS. 2 and 4), while the other tapped hole of the same part 21 receives the fixing screw of one of the adjacent optical connector supports. After the optical connector support 3 has been unlocked from the part 21 to which it was fixed, a hooked tool (not shown) is engaged in the eye 47 to extract the optical connector support 3.

The optical connector support 3 further includes an opening 48 through one of the branches of the U-shape finger 30 close to the base of the U. As can be seen in particular in FIG. 12, the opening 48 receives one of the resilient blades 23 or 23' on the part 21 added on to the end of a shorter partition 20. The opening 48 and the relevant blade 23 or 23' constitute an end stop when the optical connector support 3 is being withdrawn in the direction of an arrow R, FIG. 12. The stop comes into effect just before the optical connector support would otherwise leave the cavity 10. When opposite to the opening, the blade 23 is no longer pressed flat by the finger and therefore engages in the opening. The end of the resilient lock blade abutting against one of the sides of the opening prevents complete withdrawl of the support 3 without the aid of a tool for disengaging the blade from the opening. In contrast, when the optical connector support 3 is being inserted into its cavity 10, the other side of the opening cams the blade as the support advances and pushes it back against the part 21 on which it is mounted, in such a manner as to ensure that the blade does not hinder insertion.

This ready extraction of any one of the optical connector supports 3 independently of any of the other optical connector supports makes it possible, where necessary, to make repairs on the end fitting on one optical connector support without touching or interrupting the connections established via the other connector supports. Further, in the usual case of a repair requiring the end of the fiber to be cut and a new and fitting installed on the newly cut end, the reserve of fiber coiled on the coil former makes this operation possible without having to shorten all the other fibers in the same cable.

We claim:

1. An optical cable header for providing optical connections to individual fibers of an optical cable by bringing connection end fittings mounted on the individual cable fibers with other connection end fittings on external optical fibers, the improvement wherein said header comprises:

a plurality of optical connector supports, each support having an elongate body in the form of a hollow finger having opposite ends, an optical connector member fixedly mounted to each hollow finger at one end and being coupled to a connection end fitting, a coil former on one side of each hollow finger adjacent the other of said opposite finger ends, for receiving the single fiber of said cable, said cable fiber terminating at said connection end fitting inside said finger; and a magazine having laterally opposed sidewalls and opposite front and rear faces at opposite ends thereof, said magazine further comprising a plurality of individual cavities extending parallel to each other from said front face to said rear face and opening to said front and rear faces at respective opposite ends, said cavities receiving, respectively, said optical connector supports with said connector members constituting optical accesses to the individual fibers of said cable, and said accesses being at said front face of said magazine.

2. An optical cable header according to claim 1, wherein said magazine includes a row of oblong windows running from its rear face through at least one of its laterally opposed side walls, and wherein said windows open each of said cavities over a portion of the length of said cavities.

3. An optical cable header according to claim 2, wherein, for each of said optical connector supports, said coil former is essentially constituted by a plate having at its periphery both access means and retaining means for a length of coiled fiber, said plate being mounted to the side of said hollow finger, laterally spaced therefrom and being of a greater height than said finger so that a portion of said plate projects beyond said window opening and said cavity in which the optical connector support is received with said plate positioned outside said magazine.

4. An optical cable header according to claim 3, wherein said windows corresponding respectively to successive cavities alternate within said opposed side walls of said magazine.

5. An optical cable header according to claim 4, wherein for each of said optical connector supports, the coil former covers, on said magazine, substantially twice the height of each cavity, and wherein the optical connector supports received in successive cavities are positioned such that the coil formers carried thereby alternate from one side to the other of the magazine.

6. An optical cable header according to claim 3, wherein said coil former plate has opposite faces, and wherein, for each optical connector support, the fiber is coiled on the opposite face of the plate to the face next to the finger, and the plate includes a window to pass the finger from the coiling face to the face next to the finger.

7. An optical cable header according to claim 3, wherein, for each of said optical connector supports, the finger has an elongate U-shaped cross section forming two branches and the plate of the coil former is mounted across said two branches of the U and has lugs extending perpendicularly therefrom fixed to the end portions of the branches of the U remote from that portion joining the branches.

8. An optical cable header according to claim 7, wherein each of said optical connector supports includes locking means for locking said support in a cavity of the magazine, said locking means being located at the end of one of the branches of the U section finger.

9. An optical cable header according to claim 3, wherein said magazine comprises a parallelipiped shaped main body with said cavities internally thereof and being provided from the front face of the magazine over its full height, on its outside with side plates extending parallel thereto and spaced therefrom, such that said side plates and said side walls of said main body, define side gills independent of the cavities, said gills loosely housing the individual fibers coming from the cable and connected to respective removable optical connector supports in the magazine.

10. An optical cable header according to claim 9, wherein said magazine includes top and bottom walls and plates that partially cover the top and bottom walls of said main body, said plates extending substantially from said rear face up to each side plate, each of said top and bottom plates defining with said body at least one path between itself and the wall it covers leading to the side gill for receiving the individual fibers.

11. An optical cable header according to claim 10, wherein each of said top and bottom walls of the main body has a longitudinally extending tapering rib projecting therefrom including a narrow end extending toward the rear face of the magazine and defining on both sides thereof, two distinct paths for individual fibers of the cable separated into two individual sets.

12. An optical cable header according to claim 9, wherein one of the partitions of each cavity is provided, close to the rear face of the magazine, with a resilient blade which projects into the cavity and which is pressed against the partition by the optical connector support, and wherein each of said optical connector supports has an opening through its hollow finger at a branch near the end fitted with said connector member forming a trap for said resilient blade, thereby forming a stop for preventing the optical connector support from being directly fully withdrawn from its cavity, while not hindering insertion thereof.

13. An optical cable header according to claim 12, wherein said main body comprises add-on parts, placed at the end adjacent the rear face of the magazine on each partition common to the successive cavities taken in pairs, and wherein the resilient blades of successive different respective cavities in the main body comprise pairs mounted to said add-on parts.

14. An optical cable header according to claim 9, wherein at least one of the magazine body side walls includes slide ways constituting a row of external guides on the front part of said at least one side wall, said slideways serving to position and hold housings of equipment for connection to the connector members of the optical connector supports.

15. An optical cable header according to claim 9, wherein each magazine includes on the front portion of each of its top and bottom walls, a slide guide rib for mounting said header between two fixed supports, together with positioning means for positioning said header relative to said supports.

* * * * *